Patented May 16, 1944

2,349,089

UNITED STATES PATENT OFFICE 2,349,089

STABILIZED DIAZONIUM DERIVATIVE OF PHTHALOCYANINE COMPOUNDS

Norman Hulton Haddock, Blackley, Manchester, England, assignor to Imperial Chemical Industries Limited, a corporation of Great Britain No Drawing. Application August 30, 1941, Serial No. 408,931. In Great Britain May 25, 1939

2 Claims. (Cl. 260—141)

This invention deals with novel derivatives of phthalocyanine compounds, which may be designed generically as stable derivatives of diazotised tetra-amino-phthalocyanines.

It is an object of this invention to provide novel compounds of the phthalocyanine series, which may be useful in dyeing textile fiber. Other and further important objects of this invention will appear as the description proceeds.

This application is a continuation-in-part of my copending application Serial No. 335,871, filed May 17, 1940 (Pat. No. 2,280,072, issued April 21, 1942).

In my parent application I have described a novel method for producing metal-free and metallic tetra-amino-phthalocyanines. According to my said invention tetra-amino-phthalocyanines are prepared by reducing the corresponding tetra-nitro-phthalocyanines by the aid of special reducing agents such as sodium sulfide, sodium hydrogen sulfide, sodium disulfide, stannous chloride or sodium hydrosulfite.

As typical tetra-nitro-phthalocyanines which may be economically employed for this purpose, there were mentioned copper tetra-(4)-nitro-phthalocyanine, copper tetra-(3)-nitro-phthalocyanine, mixtures of these; other metallic tetra-nitro-phthalocyanines for instance those of cobalt, nickel, aluminum, lead or magnesium; and also metal-free tetranitro-phthalocyanine.

The tetra-amines thus obtained, in good yield, were described as generally green in color and insoluble in water. They are turned blue by the action of acids, for example hydrochloric acid, seemingly owing to salt formation. When subjected to the action of nitrous acid, they are readily diazotised, and in this form are useful as intermediates, namely diazo components, in the preparation of coloring matters.

Moreover, the tetra-diazo compounds thus obtained may be precipitated in a form suitable for technical handling, that is in solid state, by adding to the solutions thereof, zinc chloride, cadmium chloride or other salt suitable for the production of double salts or naphthalene or other sulphonic acids which will give sulphonic acid salts of the tetra-diazo compounds sparingly enough soluble in water to be precipitated, e. g. naphthalene 1:5-disulphonic acid. Other tetra-diazonium derivatives may also be obtained in the solid state, namely the alkali salts of the phthalocyanine iso-diazotates. The latter I have found can be made by the usual methods employed in converting aromatic diazonium salts into the corresponding iso-diazotates. For example, the potassium tetra-(4)-iso-diazotate of copper phthalocyanine is prepared by adding a solution of the tetra-diazonium chloride to an excess of aqueous potassium hydroxide at −10° C. and then adding the mixture to a large volume of concentrated aqueous potassium hydroxide at not less than about 120° C.

The present application is concerned primarily with the said solid tetradiazonium derivatives.

I have found that the above stable derivatives of tetradiazo-phthalocyanines, whether of the double-salt type or of the sulfonate type or of the isodiazotate type possess valuable properties, and may be used as intermediates for the production of phthalocyanine azo dyestuffs either in substance or on the fiber.

Thus, they may be applied to cellulosic fiber from aqueous bath and then developed on the fiber with various azoic coupling components, producing violet to green and grey shades of good fastness properties, including outstanding fastness to washing. Among the azoic coupling components suitable for this purpose may be mentioned β-naphthol, 2-hydroxy-3-naphthoic anilide, bis-acetoacet-o-tolidide, 1-phenyl-3-methyl-5-pyrazolone, resorcinol, α-naphthol, 2:3-hydroxy-naphthoic-o-toluidide, 2:3-hydroxynaphthoic-p-anisidide and the p-chloranilide of 2-hydroxycarbazole-3-carboxylic acid. Or the diazonium derivatives may be coupled to said azoic coupling components in a reaction vessel, producing the corresponding pigments in substance.

Alternatively, the stable phthalocyanine-diazonium derivatives of this invention may be applied to the fiber from aqueous bath, and then treated on the fiber with reagents and under conditions adapted to decompose the diazonium groups liberating nitrogen, producing on the fiber insoluble phthalocyanine derivatives. Green to blue shades of excellent fastness properties may thus be obtained. The developing substances selected for this purpose may be organic or inorganic compounds, and the vast field of applicable agents may be illustrated by the following: water, ethyl alcohol, potassium iodide, potassium bromide, potassium ethyl xanthate, sodium ethyl xanthate, pyridine, sodium stannite, sodium sulphite, sodium oleyl sulphate, potassium ferrocyanide, ammonia, sodium sulphide, formic acid, sodium thiosulphate, benzoquinone, hydrazine sulphate, potassium cyanate, sodium formate, sodium hypophosphite, sodium thiocyanate, sodium cuprocyanide and alkaline formaldehyde.

The dry phthalocyanine diazonium compounds are green powders which are stable at ordinary temperature and can be stored for long periods out of contact with moisture. The double-salts and the iso-diazotates are readily soluble in water; the sulphonates are sparingly so. The solutions in water lose nitrogen rapidly on warming with the formation of green precipitates.

The invention is illustrated but not limited by the following examples, in which the parts are by weight.

Example 1

10 parts of copper tetra-(4)-nitrophthalocyanine in the form of a finely milled 10% aqueous paste are stirred in a vessel immersed in a bath of cold water, and 24 parts of crystalline sodium sulphide, dissolved in the minimum quantity of water, are added slowly so that the temperature does not exceed 20° C. After stirring for 20 hours 100 parts of 10% sodium sulphite solution are added. The dark green product is filtered off, washed well with water and dried.

Instead of 24 parts of crystalline sodium sulphide, 21 parts of 27% sodium disulphide solution may be used.

The zinc chloride double salt of copper tetra-(4)-diazoniumphthalocyanine chloride is made as follows: 12.3 parts of finely divided copper tetra-(4)-aminophthalocyanine in the form of an aqueous paste are mixed with 120 parts of water and 6 parts of sodium nitrite. This mixture, cooled to 5° C., is then added to 90 parts of concentrated aqueous hydrochloric acid (sp. gr. 1.16) previously cooled to 0° C. To the clear dark green solution of diazo compound thus obtained there is added a solution of 25 parts of zinc chloride in 50 parts of 0.5% aqueous hydrochloric acid. There is formed a dark green finely divided precipitate. This is filtered off, washed with acetone and dried. This is a zinc double salt. It is readily soluble in cold water to give a greenish blue solution.

Example 2

10 parts of copper tetra-(4)-nitrophthalocyanine in the form of a finely milled 10% aqueous paste is stirred in an ice-bath. 34 parts of 30% aqueous sodium hydrogen sulphide solution are added at such a rate that the temperature of the mixture does not exceed 25° C. After 20 hours, the dark green suspension is diluted with 70 parts of 10% sodium sulphite solution. The product is filtered off, washed with 5% aqueous sodium sulphite and then with water. It may now be dried to a green powder or conveniently the wet filtercake may be used for a subsequent chemical operation, e. g. diazotisation.

The potassium tetra-(4)-iso-diazotate of copper phthalocyanine is made as follows:

30 parts of finely divided copper tetra-(4)-amino-phthalocyanine in the form of an aqueous paste are mixed with 350 parts of water and 150 parts of concentrated aqueous hydrochloric acid (sp. gr. 1.16). To the mixture at 5° C. is added a solution of 15 parts of sodium nitrite in 50 parts of water. The temperature is maintained throughout at 5° C. or below. The dark green diazo solution is now added to a stirred mixture at −10° C. of 1200 parts of potassium hydroxide and 800 parts of water. The green solution so obtained is added rapidly to a mixture of 1600 parts of potassium hydroxide and 400 parts of water previously heated to 120° C. The temperature is maintained at not less than 120° C. during the addition. The mixture is cooled to 100° C. and the tetra-isodiazotate, in suspension, is filtered off through asbestos paper. It is pressed under vacuum till dry. The product is a dark green powder soluble in cold water to give a bluish green solution.

Example 3

10 parts of copper tetra-(4)-nitrophthalocyanine in the form of a finely milled 15% aqueous paste are stirred with 200 parts of 33% aqueous hydrochloric acid until a smooth paste is formed. The suspension is cooled to 5° C. and 50 parts of crystalline stannous chloride added gradually so that the temperature of the mixture does not exceed 10° C. The reduction is complete when a test portion added to water gives a violet coloured precipitate which rapidly changes to bright blue when exposed to air. After dilution with an equal volume of water the product is then filtered off and sucked as dry as possible on the filter. The filter cake is made into a paste with 200 parts of a 16% sodium hydroxide solution and the mixture boiled for 5 minutes after which it is filtered hot. This process is repeated until the product is free from tin and finally, the copper tetra-(4)-aminophthalocyanine, so obtained, is washed with water until free from inorganic matter and dried. It is green in colour and becomes blue on treatment with sulphuric acid.

Copper tetra-(4)-aminophthalocyanine is diazotised as follows. 30 parts thereof as a finely milled aqueous paste are stirred with 20 parts of sodium nitrite and in all 500 parts of cold water. To this mixture (at below 10° C.) is quickly added with stirring 500 parts of 33% aqueous hydrochloric acid. After a few minutes stirring a clear deep green solution of the tetradiazo compound is obtained.

The same result is obtained when the suspension of tetra-amino compound in aqueous sodium nitrite is added to the aqueous hydrochloric acid.

The copper phthalocyanine tetra-(4)-diazonium chloride obtained above is converted into a stable salt with naphthalene-1:5-disulphonic acid as follows. The solution of the copper phthalocyanine tetra-(4)-diazonium chloride (derived from 30 parts of copper tetra-(4)-aminophthalocyanine) which is at a temperature of 5° C. is added to a solution of 160 parts of disodium naphthalene-1:5-disulphonate in 1200 parts of water, previously cooled to 0° C. The precipitated sulphonic acid salt is filtered off and washed with acetone and dried. The green product is very sparingly soluble in water.

Instead of being caused to interact with naphthalene-1:5-disulphonic acid, the copper phthalocyanine tetra-(4)-diazonium chloride obtained above may be converted into the corresponding isodiazotate in the manner described in Example 2.

In a similar manner cobalt tetra-aminophthalocyanine, metal-free-tetra-aminophthalocyanine, or other metallic tetra-aminophthalocyanines may be diazotised and converted into stable solid tetradiazonium salts by the aid of zinc chloride, cadmium chloride, 1,5-naphthalene-disulfonic acid, naphthalene-trisulfonic acid, etc.

As many apparently widely different embodiments of this invention may be made without departing from the spirit and scope thereof, it is to be understood that I do not limit myself to specific embodiments except as defined in the appended claims.

The species of the above invention not included in the scope of the subjoined claims are being claimed in my copending applications Serial Nos. 443,668 and 443,669, filed May 19, 1942.

I claim:

1. A tetra-diazonium derivative of the phthalocyanine series, stabilized in solid form by salt formation with an aromatic sulfonic acid.

2. The naphthalene-1,5-disulfonic-acid salt of tetra-diazonium-copper-phthalocyanine.

NORMAN HULTON HADDOCK.